(12) United States Patent
Murray

(10) Patent No.: US 8,537,436 B2
(45) Date of Patent: Sep. 17, 2013

(54) OBLIQUELY MOUNTED MOTOR ON SCAN BAR ASSEMBLY

(75) Inventor: Richard A. Murray, San Diego, CA (US)

(73) Assignee: Eastman Kodak Company, Rochester, NY (US)

( * ) Notice: Subject to any disclaimer, the term of this patent is extended or adjusted under 35 U.S.C. 154(b) by 317 days.

(21) Appl. No.: 13/028,417

(22) Filed: Feb. 16, 2011

(65) Prior Publication Data

US 2012/0206749 A1    Aug. 16, 2012

(51) Int. Cl.
*H04N 1/04* (2006.01)
(52) U.S. Cl.
USPC ............ 358/497; 358/474; 358/494; 358/482
(58) Field of Classification Search
USPC .................. 358/497, 474, 494, 482, 400, 471
See application file for complete search history.

(56) References Cited

U.S. PATENT DOCUMENTS

| | | | |
|---|---|---|---|
| 5,875,042 A | 2/1999 | Kashitani | |
| 6,246,492 B1 | 6/2001 | Chang et al. | |
| 6,330,084 B1 * | 12/2001 | Chiang | ........................ 358/497 |
| 6,377,382 B1 | 4/2002 | Kato | |
| 6,886,464 B2 * | 5/2005 | Inoue et al. | ................... 101/485 |
| 2005/0219651 A1 | 10/2005 | Uchida | |
| 2008/0180755 A1 | 7/2008 | Bokelman | |
| 2009/0034019 A1 | 2/2009 | Hill et al. | |
| 2009/0190190 A1 | 7/2009 | Yamauchi | |
| 2009/0237748 A1 | 9/2009 | Yabuta | |

* cited by examiner

*Primary Examiner* — Houshang Safaipour
(74) *Attorney, Agent, or Firm* — Peyton C. Watkins

(57) ABSTRACT

A scan bar assembly includes a scan element including a length direction; and a motor including an axle, wherein the axle of the motor is not parallel to the length direction of the scan element.

19 Claims, 17 Drawing Sheets

OBLIQUELY MOUNTED MOTOR ON SCAN BAR ASSEMBLY

CROSS REFERENCE TO RELATED APPLICATION

Reference is made to commonly assigned, co-pending U.S. patent application Ser. No. 12/842,074, filed Jul. 23, 2010, entitled: "Compact Housing for a Scan Bar Assembly"; and U.S. patent application Ser. No. 13/028,433, filed Feb. 16, 2011, entitled: "Scanning Apparatus with Circuit Board Overlapping Platen", the disclosures of which are incorporated herein by reference.

FIELD OF THE INVENTION

The present invention relates to a scan bar assembly for an optical scanner, and more particularly to the mounting of a motor on the scan bar assembly.

BACKGROUND OF THE INVENTION

Optical scanners operate by imaging an object (e.g. a document) with a light source, and sensing a resultant light signal with an optical sensor array. Each optical sensor or photoreceptor in the array (typically a linear array) generates a data signal representative of the intensity of light impinged thereon for a corresponding portion of the imaged object. The data signals from the array of sensors are then processed (typically digitized) and stored in a temporary memory such as a semiconductor memory or on a hard disk of a computer, for example, for subsequent manipulation and printing or display, such as on a computer monitor. The image of the scanned object is projected onto the optical photo sensor array incrementally by use of a moving scan line. The moving scan line is produced either by moving the document with respect to scan bar assembly that includes the array of optical sensors, or by moving the scan bar assembly relative to the document. Either or both of these methods may be embodied in a flat bed scanner, multi-function printer, or any scanner having manual and automatic feed capabilities.

A common type of scanner uses a contact image sensor (CIS) scan bar. A CIS scan bar includes a contact image sensor scan element having a length that is substantially equal to the width of the scanning region. The photoreceptors in a CIS are substantially the same size as the pixel resolution of the scanner. The CIS has a short depth of field and is typically mounted beneath the transparent plate (scanner glass) upon which the document is placed. A scan bar assembly includes the CIS scan element, as well as gears for power transmission to move the scan bar assembly. One or more roller spacers in the CIS scan bar assembly are biased against the bottom of the scanner glass so that the CIS scan element is always at substantially the same distance from the top of the scanner glass.

U.S. Pat. No. 6,246,492 discloses a movable module, which includes a contact image sensor and a driving motor and which can slide back and forth along a track to scan an image. The driving motor exerts a force by means of a pinion on a fixed rack attached to the frame of the scanner.

U.S. Patent Application Publication 2009/0034019 describes a scanner module including the optical components, where the scanner module is carried by a carriage that includes a motor and associated gears. FIG. 1 (prior art) is a copy of FIG. 2 of U.S. Patent Application Publication 2009/0034019 and FIG. 2 (prior art) is a copy of FIG. 4 of U.S. Patent Application Publication 2009/0034019. Scanner 120 includes platen 122, carriage 124, wheels 126, bias 128, drive 130, light source 132, reflected light capture unit 134, and sensor array (not shown). Light source 132, reflected light capture unit 134 and the sensor array are joined to one another to form a scanner module 135 which includes a body 204 and wheels 126. Module 135 is carried by carriage 124. Platen 122 includes a plate, at least a portion of which is transparent, configured to support on its top surface 144 a document or other article to be scanned. Central portion 200 comprises that portion of platen 122 through which light is transmitted and through which reflected light passes. Side portions 202 may be transparent or may be opaque. Side portions 202 provide surfaces against which wheels 126 rotate. Carriage 124 carries reflected light gathering unit 134, light source 132 and the sensor array as they are moved across and along platen 122. Scan module 135 includes body 204 and two opposing wheel wells 206 that are sized to receive wheels 126, which are retained by caps 210. Bias 128 includes one or more members, such as wheels 214, configured to resiliently urge carriage 124, wheels 126 and reflected light gathering unit 134 towards platen 122. As a result, wheels 126 are maintained in constant contact with surface 152 as carriage 124 is moved across platen 122. Wheels 214 are urged against a stationary surface 216 (schematically shown) associated with the housing of scanner system 120. Drive 130 is configured to move carriage 124 in either direction as indicated by arrows 158 (called the scan direction herein). Drive 130 moves carriage 124 and reflected light gathering unit 134 across platen 122 such that a document may be scanned. In the example shown in FIGS. 1 and 2, drive 130 includes motor 220, worm gear 224, drive gear 225, pinion gears 226, 228 and rack 230 (schematically shown in FIG. 1). Motor 220 is carried by carriage 124 and is connected to an encoder (not shown). Worm gear 224 is in engagement with drive gear 225 which is part of a compound gear also including pinion gear 226. Pinion gears 226 and 228 are in engagement with rack 230. Rotation of pinion gears 226, 228 results in carriage 124 being driven along rack 230 relative to platen 122. Because scanner module 135 (FIG. 2) is made separately from carriage 124 (FIG. 1), some means of affixing scanner module 135 to carriage 124 is required. Visible in FIG. 1, but not originally labeled in U.S. Patent Application Publication 2009/0034019 are bolts 125 for attaching scanner module 135 to carriage 124. Also originally unlabeled in FIG. 1 of U.S. Patent Application Publication 2009/0034019 (but identifiable by one who is familiar with conventional scan bar designs) is gear retainer tab 127, which is typically formed of a piece of stamped metal that is bolted to carriage 124 with one of the bolts 125. A further component that is unlabeled in U.S. Patent Application Publication 2009/0034019 but that is readily identifiable in FIG. 1 is motor printed circuit board 221 that is used for connecting power to motor 220 and for attaching the rotary encoder sensor that monitors rotation of the motor axle.

The prior art scan bar assembly shown in FIGS. 1 and 2 is satisfactory in many applications. However, for small footprint scanners or multi-function printers, a limitation to the reduction in overall size can be the size of the scan bar assembly. In particular, a typical width of a scan bar assembly along a scan direction 158 (approximately the distance between outer edges of wheels 214 in FIG. 1) is about 7 centimeters or greater. A smaller footprint multi-function printer can result in improved convenience to the user, as well as cost savings. In addition, in the prior art configuration of FIGS. 1 and 2, the heaviest component of scan bar assembly (motor 220) is positioned relatively far from the light gathering unit 134 and the associated scan element, as well as from the drive bearing datums. Such a configuration can lead to motion instability and vibration effects. Improved motion stability allows faster scanning, through reduced settling time, and also requires less mechanical structure support.

What is needed is a scan bar assembly having a more compact configuration, and having the center of mass of the scan motor moved closer to the centerline of the scan element and the drive bearing datums, in order to achieve lower cost, improved motion stability, and faster scanning capability.

SUMMARY OF THE INVENTION

The present invention is directed to overcoming one or more of the problems set forth above. Briefly summarized, according to one aspect of the invention, the invention resides in a scan bar assembly includes a scan element including a length direction; and a motor including an axle, wherein the axle of the motor is not parallel to the length direction of the scan element.

The present invention also resides in an imaging system includes a scanner glass; a frame including: a holder for the scanner glass; and a rack having a row of rack teeth; and a scan bar assembly comprising: a scan element including a length direction; a gear that is engaged with the rack teeth of the rack; and a motor including an axle, wherein the axle of the motor is not parallel to the length direction of the scan element.

DETAILED DESCRIPTION OF THE INVENTION

Figure 2:
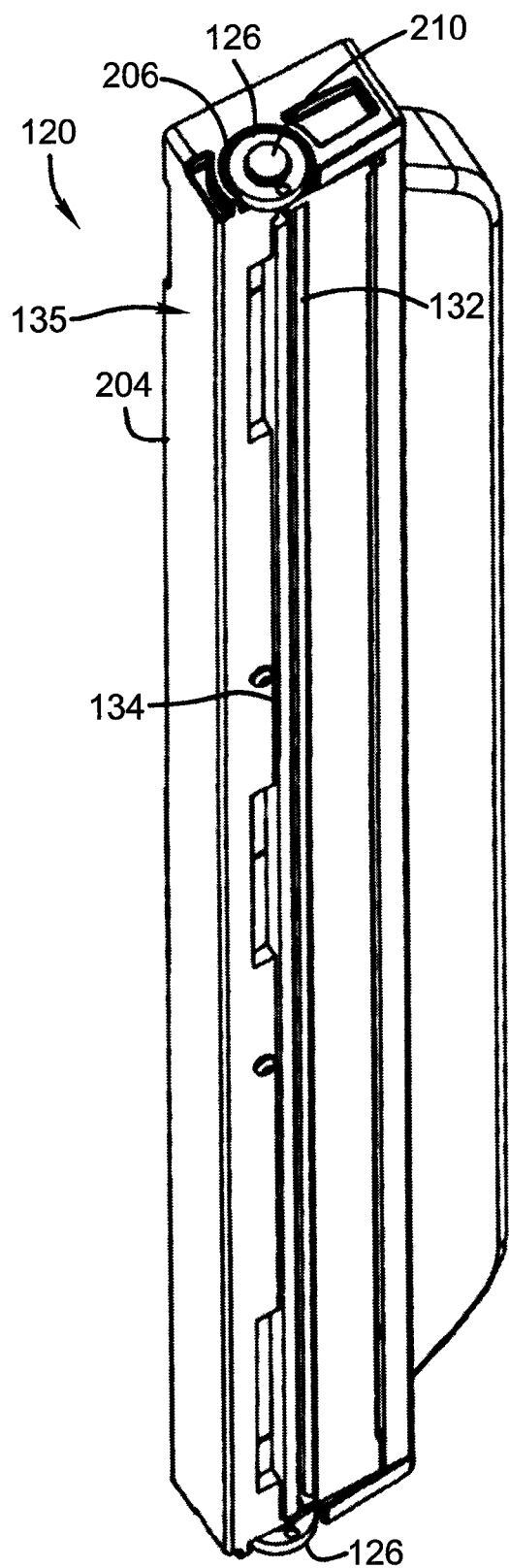
FIG. 2 shows a top perspective view of a scanner module of the prior art scanner of FIG. 1.
Figure 3:
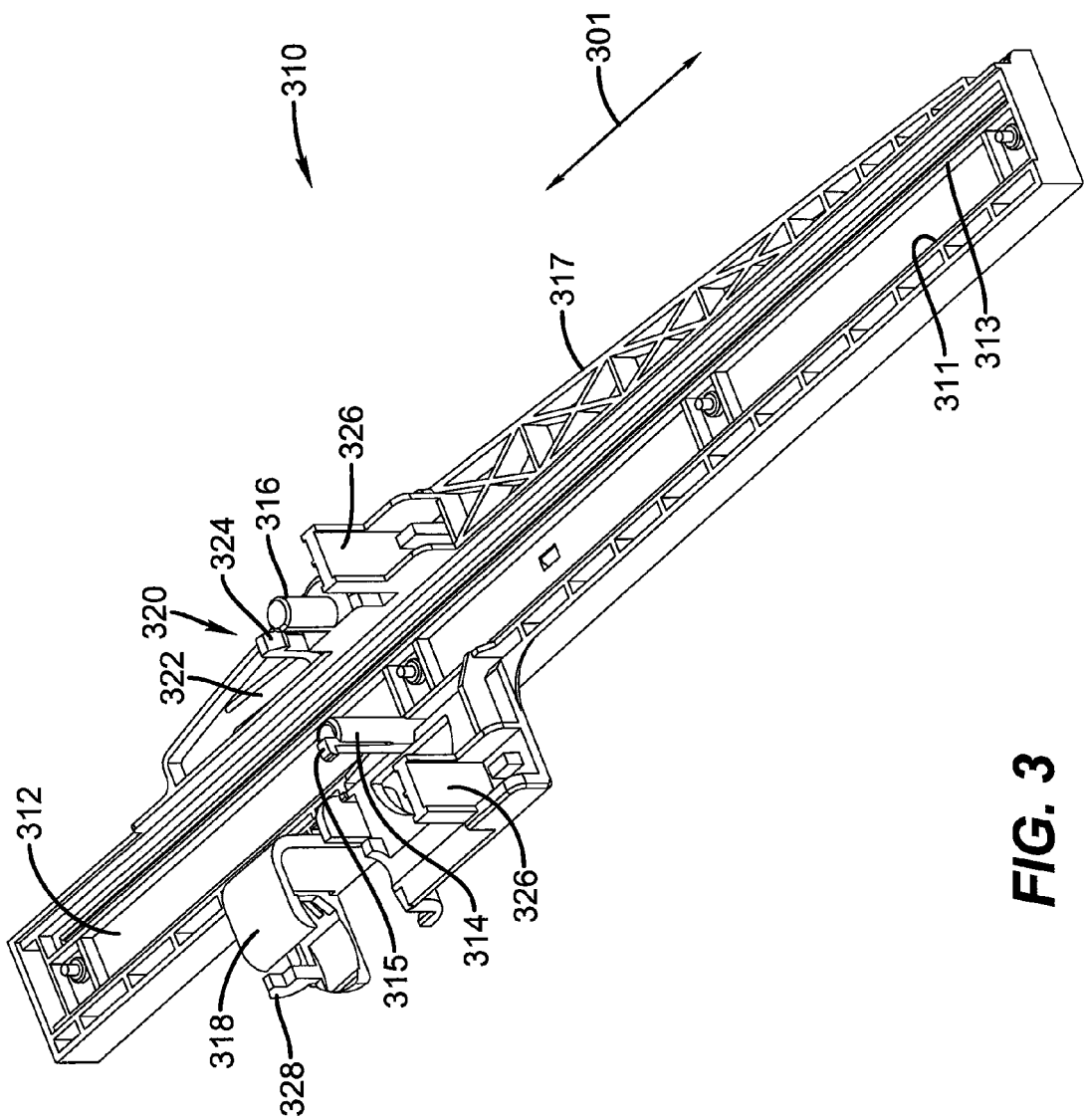
FIG. 3 is a bottom perspective view of a housing for a scan bar assembly.
Figure 7:
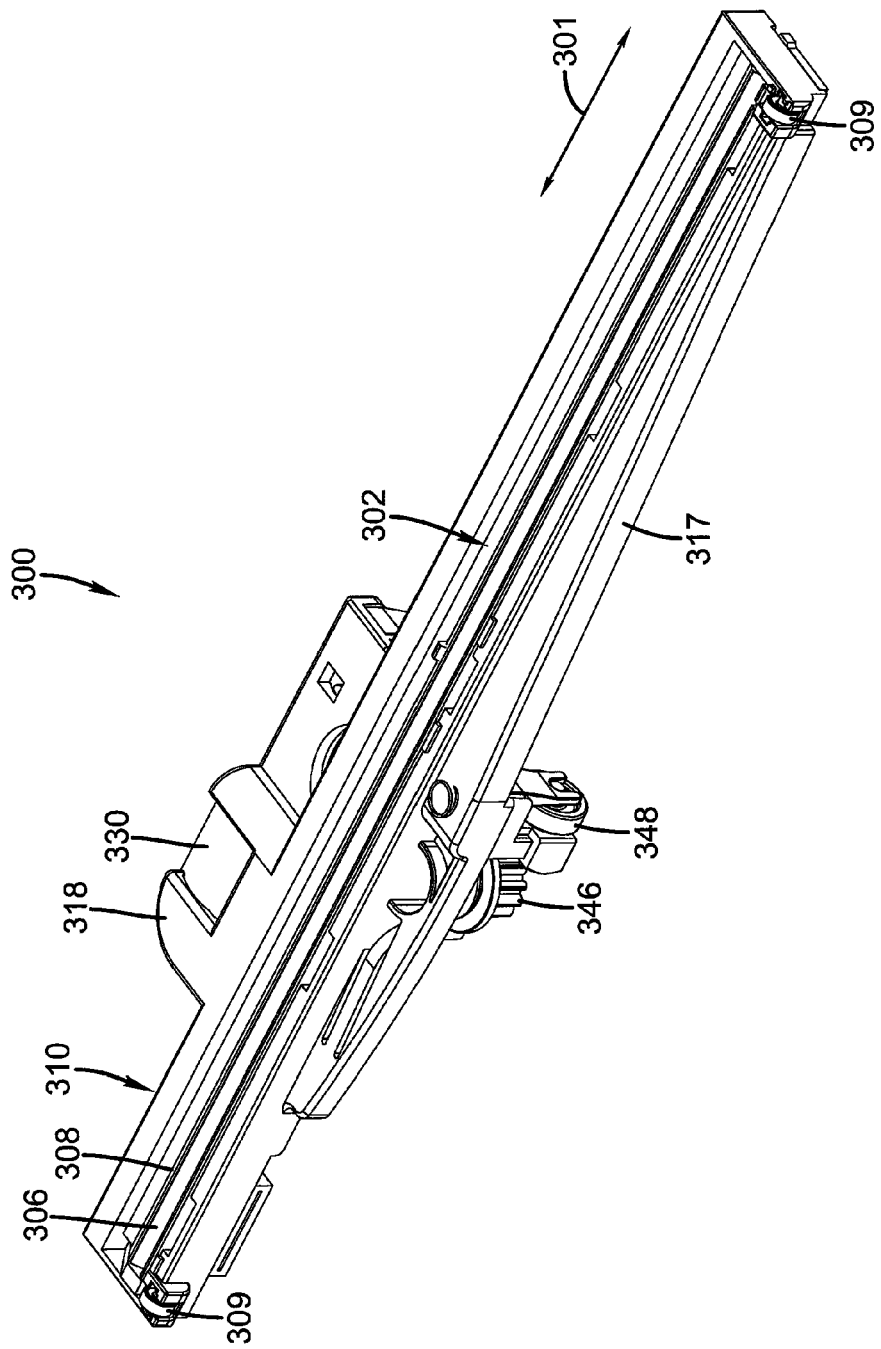
FIG. 7 is a top perspective view of a portion of the scan bar assembly shown in FIG. 4.

FIG. 3 is a bottom perspective view of a housing 310 for a scan bar assembly 300 (see FIG. 4) as described in U.S. patent application Ser. No. 12/842,074. Housing 310 includes a mounting region 312 for a scan element 302 (see FIGS. 4 and 7), a first mounting member 314 for a drive gear 340 (see FIG. 4), a second mounting member 316 for a follower gear 346 (see FIG. 4) and a clip 318 for mounting a motor 330 (see FIG. 4). In other words, housing 310, which can be integrally formed as a single part by injection molding, for example, is configured for attachment of the optical components as well as the power transmission components for moving the scan bar assembly 300. Therefore it is not required to bolt together a scan module containing optical components and a carriage containing power transmission components as in the prior art shown in FIGS. 1 and 2. In addition to facilitating assembly of the scan bar, using a single integrally formed housing for the optical components and the power transmission components also provides tighter tolerances in the relative location and orientation of the scan element and the gears that control its motion within the scanner. Referring to FIG. 3, mounting region 312 includes a first wall 311 and a second wall 313 that is opposite the first wall 311. The first mounting member 314 is located near first wall 311, and the second mounting member 316 is located near second wall 313. In the example shown in FIG. 3, housing 310 includes an outer wall 317 that is located near second wall 313. Unlike first wall 311 and second wall 313, which are substantially parallel to length direction 301, outer wall 317 is bowed outwardly in the region near second mounting member 316 and then tapers toward its ends, as also shown in FIG. 7.

Figure 1:
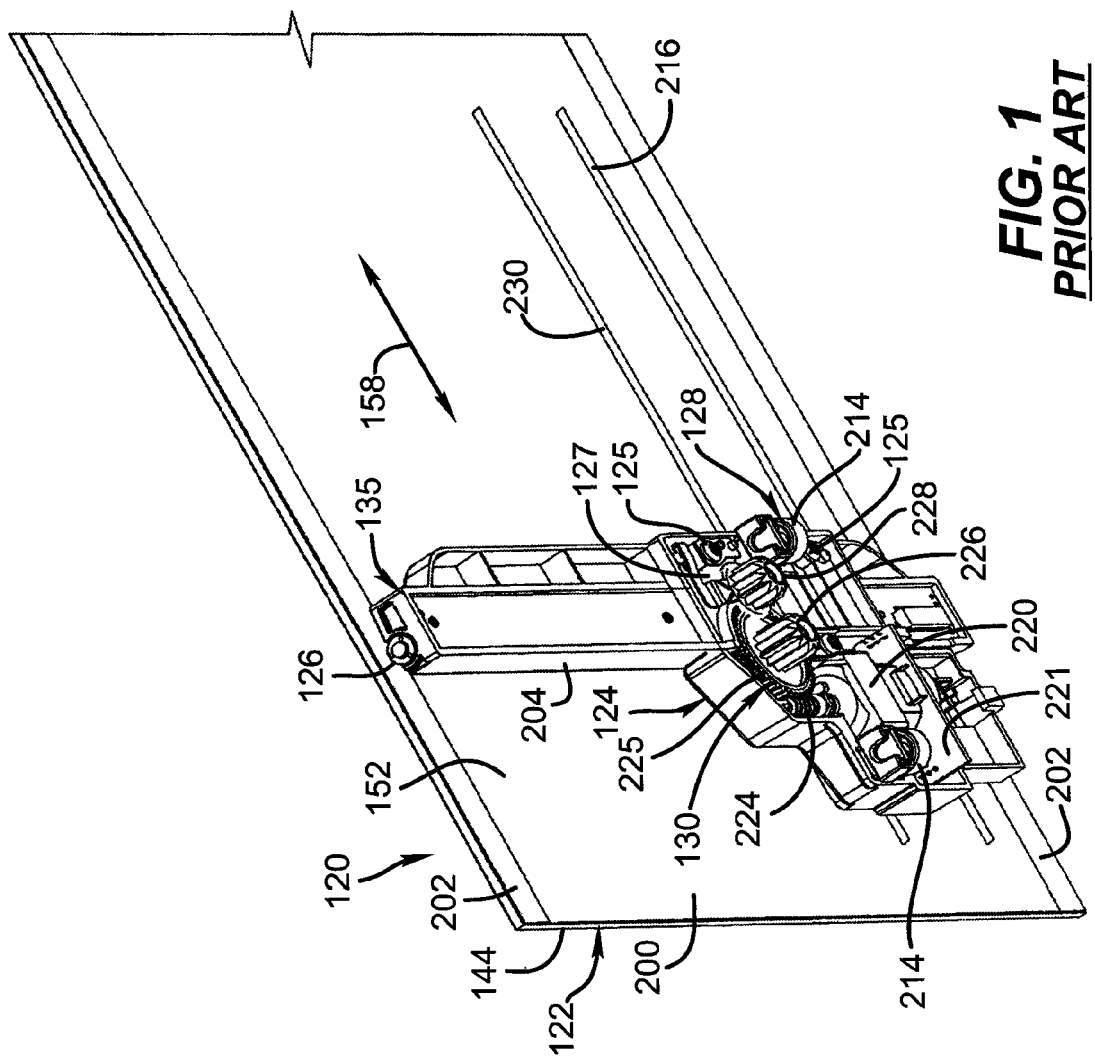
FIG. 1 shows a scanner according to prior art.

Other features that are integrally formed with housing 310 and that are shown in FIG. 1 are a gear retention member 320, including a cantilevered arm 322 and an end 324 located near the second mounting member 316; a pair of roller mount extensions 326; a support 328 for the motor printed circuit board, and a gear retaining member 315. The provision of these features in a single part housing 310 helps to reduce manufacturing cost in terms of parts count and ease of assembly. In addition, as described below, the locations provided for components that are assembled onto housing 310 enable a reduction in the width of the scan bar assembly.

Figure 4:
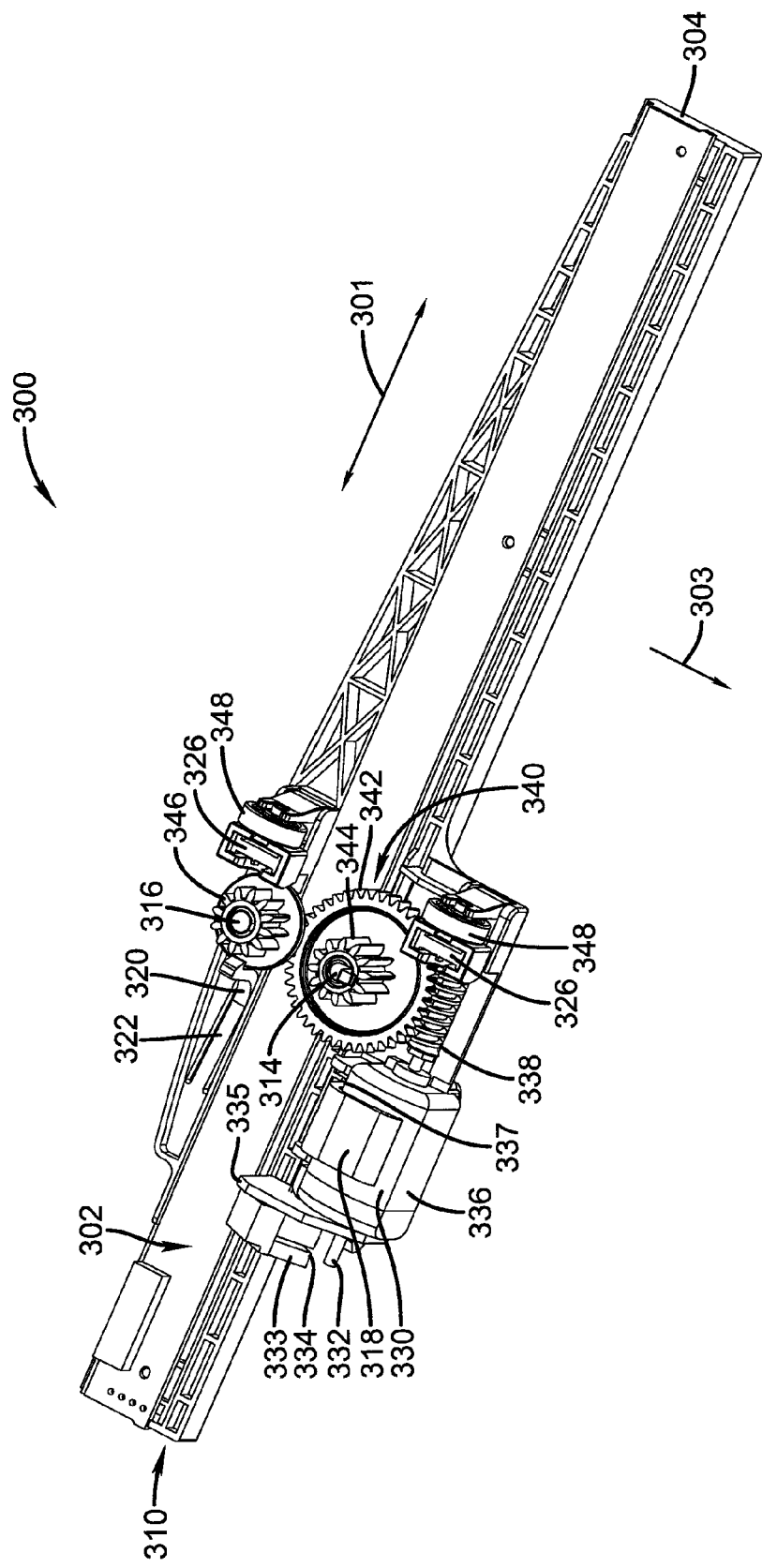
FIG. 4 is a bottom perspective view of a scan bar assembly including components mounted onto the housing of FIG. 3.

FIG. 4 shows a bottom perspective view of scan bar assembly 300, which includes housing 310 of FIG. 3, plus optical and power transmission components assembled onto it. Scan element 302 is mounted in mounting region 312 (see FIG. 3), and includes a printed circuit board 304, as well as a light source 306 and a lens 308 that are shown in the top view of FIG. 7, and a photoreceptor array (not shown). Scan element 302 extends along length direction 301, along which also the photoreceptor array (not shown) extends. The scan direction 303 along which the scan bar assembly 300 is moved during scanning an image is also indicated, and is substantially perpendicular to length direction 301. Motor 330 is snap fitted into clip 318 and includes an axle 332. Near one end of axle 332 is an encoder sensor 333 that includes a slot 334 through which an encoder wheel (not shown) passes in order to monitor the rotation of axle 332. Encoder sensor 333 is mounted on a printed circuit board 335 that also provides power to motor 330. On the other end of axle 332 is mounted worm gear 338. Drive gear 340 is a compound gear that is mounted on first mounting member 314. Drive gear 340 includes a first gear 342 that is engaged with worm gear 338. Drive gear 340 also includes a second gear 344 that is coaxial with first gear 342. Follower gear 346 is mounted on second mounting member 316. A pair of idle rollers 348 are mounted respectively on roller mount extensions 326 (see FIG. 3). Optionally a spring bias is provided to the idle roller 348 that is closest to follower gear 346 in order to push spacer rollers 309 (see FIGS. 7 and 10) into contact with the underside of the platen glass.

Motor 330 includes an innermost side 337 that is located near first wall 311 of housing 310, and an outermost side 336 that is located opposite the innermost side 337. In the scan bar assembly configuration of FIGS. 3 to 7, as described in U.S. patent application Ser. No. 12/842,074, the outermost side 336 and innermost side 337 of motor 330 are substantially parallel to length direction 301 of scan element 302. In order to reduce the width of the scan bar assembly 300, relative to the prior art shown in FIG. 1, along a direction parallel to the scan direction 303, the idle roller 348 and corresponding roller mount extension 326 closest to the motor 330 is positioned so that it does not extend beyond the outermost side 336 of the motor 330, in contrast to the prior art shown in FIG. 1. In addition in FIG. 4 it can be seen that the printed circuit board 335 for motor 330 is also positioned so that it does not extend beyond the outermost side 336 of motor 330. In fact, as seen in FIGS. 4 and 7, no component of scan bar assembly 300 that is mounted on housing 310 extends beyond outermost side 336 of motor 330. In this way it has been found possible to reduce the width of the scan bar assembly 300 along a direction parallel to scan direction 303 to six centimeters or less. A further reduction in the width of the scan bar assembly 300 along a direction parallel to scan direction 303 will be described below relative to FIGS. 12 to 17.

Figure 5:
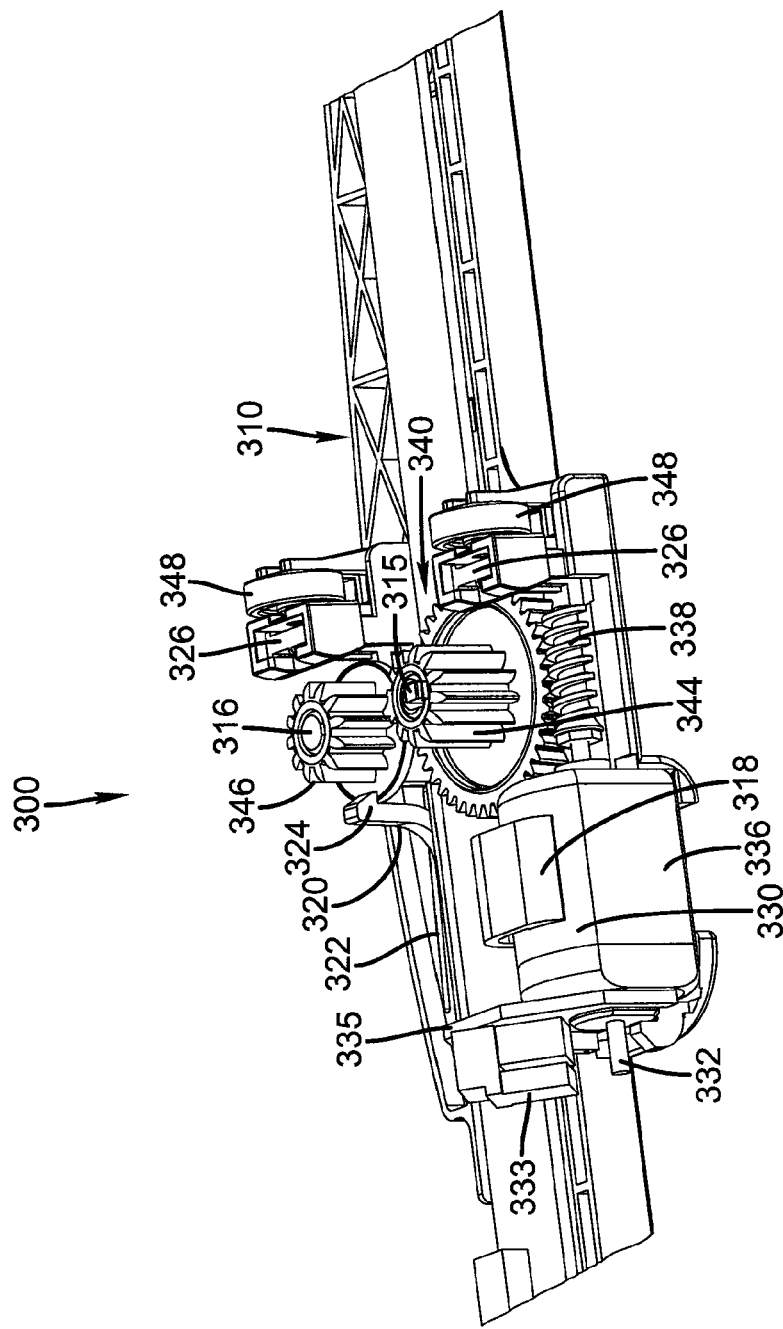
FIG. 5 is a close-up bottom perspective view of a portion of the scan bar assembly shown in FIG. 4.
Figure 6:
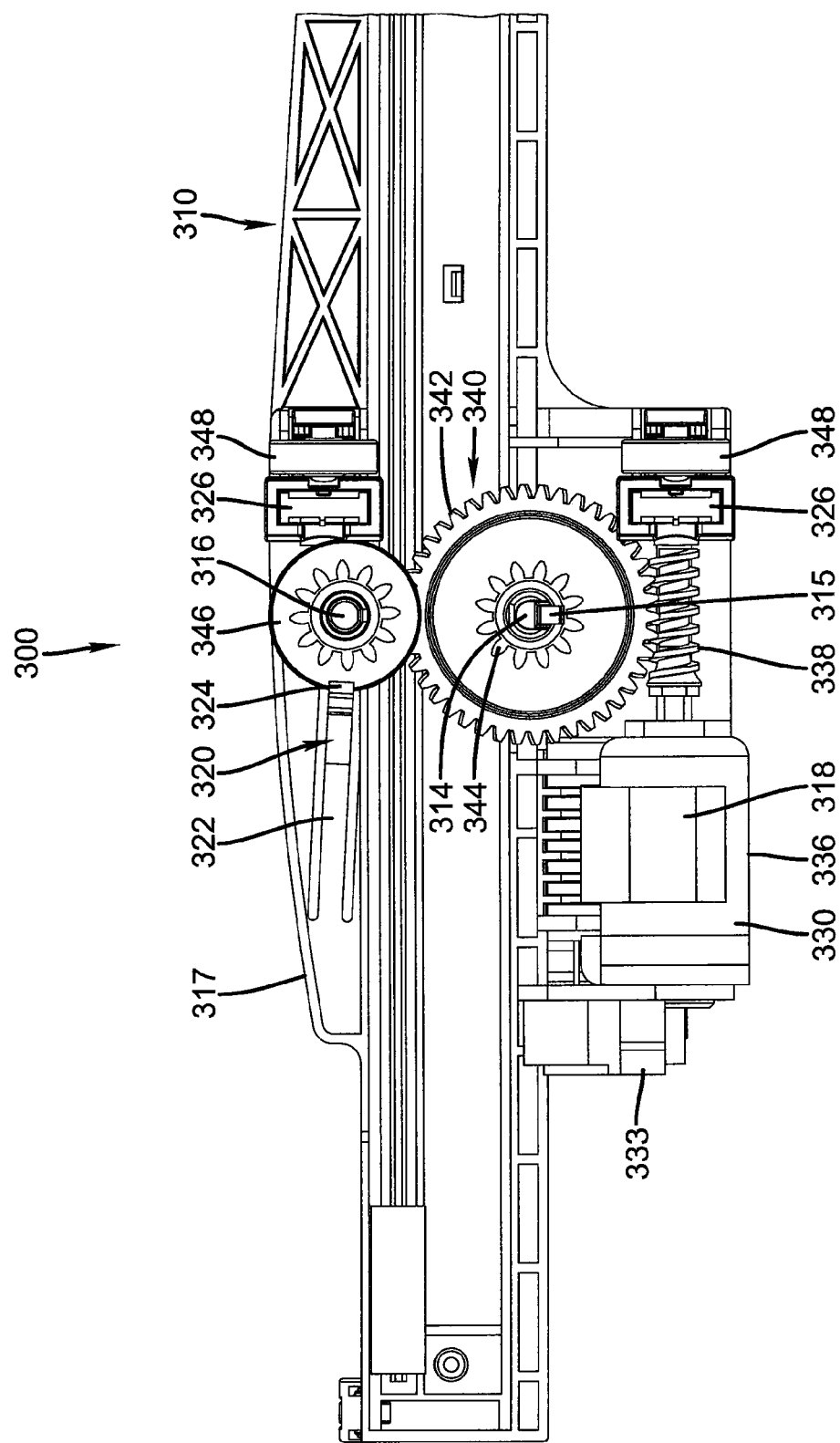
FIG. 6 is a close-up bottom view of a portion of the scan bar assembly shown in FIG. 4.

FIG. 5 provides a close-up perspective bottom view that is rotated somewhat relative to FIG. 4, in order to more clearly show the power transmission portion of scan bar assembly 300. FIG. 6 is a close-up bottom view that shows some of the same features, but at a different angle. The end 324 of gear retention member 320 is shown in contact with a rim of follower gear 346. Cantilevered arm 322 of gear retention member 320 provides a spring force so that end 324 in contact with gear retention member 320 provides a frictional drag on follower gear 346 that helps to smooth the motion of the scan bar assembly 300. A similar function is provided by prior art gear retainer tab 127 (see FIG. 1). However, gear retainer tab 127 is formed of stamped metal and is an additional component that must be assembled onto the prior art scan bar assembly. Integrally formed gear retention member 320 of the present invention provides the functions of holding the follower gear 346 in place and providing a frictional load without requiring an additional component to be assembled onto housing 310. Also shown in FIGS. 5 and 6 is gear retaining member 315 (see also FIG. 3) that is located near the axis of rotation of the drive gear 340 and that helps to keep drive gear 340 attached to housing 310.

FIG. 7 shows a top perspective view of scan bar assembly 300. Such a top perspective view is what would be seen if one opened the lid of a scanner and looked through the scanner glass. The optical components of scan element 302 are positioned near the top side of scan bar assembly 300. Light source 306 provides illumination to the document to be scanned. Reflected light is gathered through lens 308 and directed to a linear photoreceptor array (not shown, but oriented along length direction 301). Spacer rollers 309 at each end of scan bar assembly 300 are pushed into contact with the bottom surface of the scanner glass by the spring mounted idle roller 348 located near follower gear 346. Motor 330 and a portion of its associated mounting clip 318 are also visible in this view.

A method of making a scan bar assembly 300 will next be described with reference to FIGS. 3-7. Housing 310 is provided including a mounting region 312, a first gear-mounting member 314 and a second gear-mounting member 316. Housing 310 is integrally formed by injection molding, for example. A motor 330 is affixed to housing 310, for example by snap fitting the motor 330 to a clip 318 that is also integrally formed with housing 310. A scan element 302 is mounted in mounting region 312 of housing 310. A drive gear 340 is mounted on the first gear-mounting member 314. A follower gear 346 is mounted on the second gear-mounting member 316. A gear retention member 320 can be integrally formed with housing 310 and the step of mounting the follower gear 346 can include positioning follower gear 346 such that an end 324 of the gear retention member 320 is in contact with the follower gear 346. The method can further include mounting an idle roller 348 on housing 310. In order to provide a biasing force, mounting of idle roller 348 can further include mounting a spring as part of the idle roller assembly. The method can further include connecting a printed circuit board 335 for providing power to the motor 330. The method can also include providing a rotary encoder wheel on an axle 332 of motor 330 and providing an encoder sensor 333 on printed circuit board 335 for monitoring the rotation of axle 332.

Figure 8:
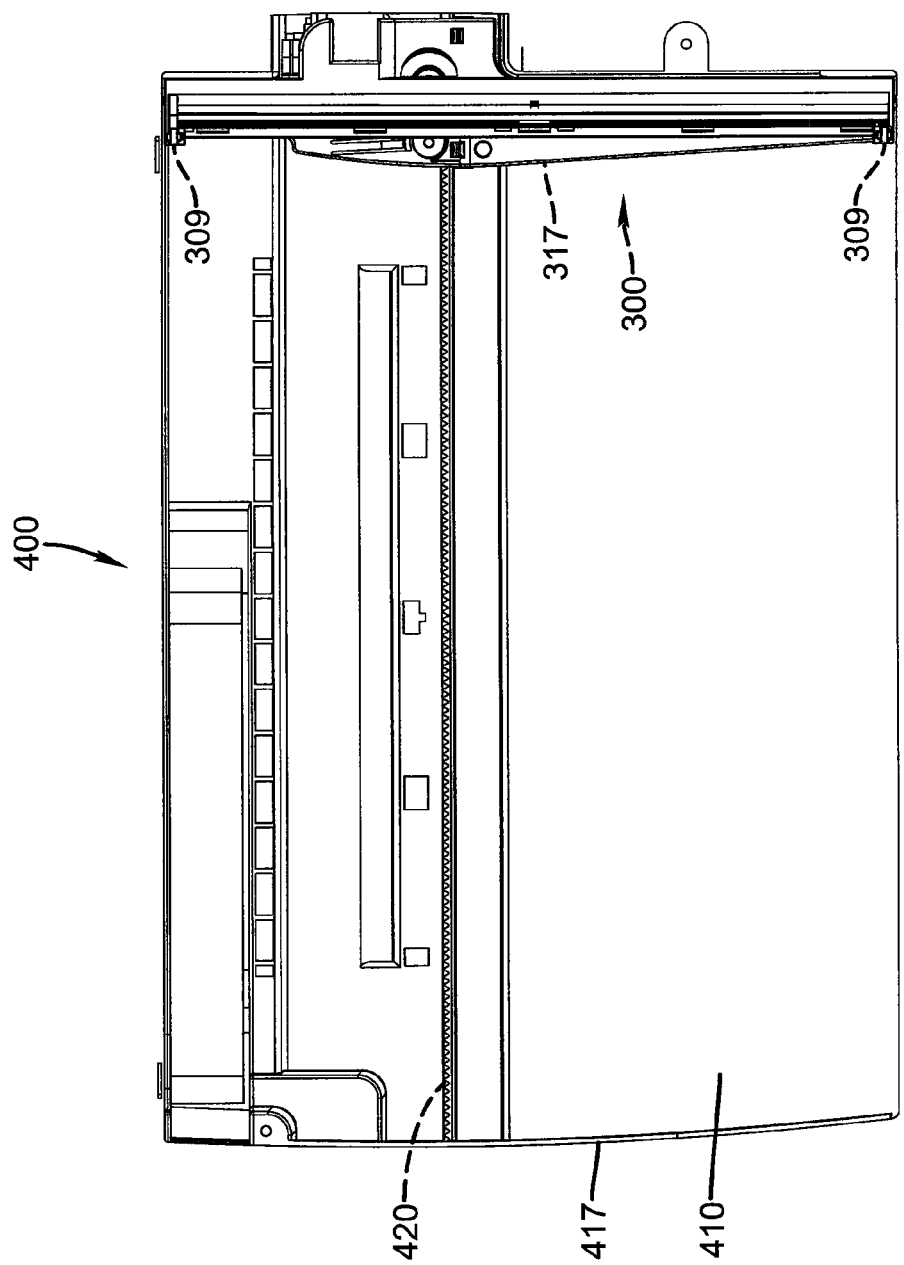
FIG. 8 is a top view of a portion of a scanner unit including a scan bar assembly.
Figure 9:
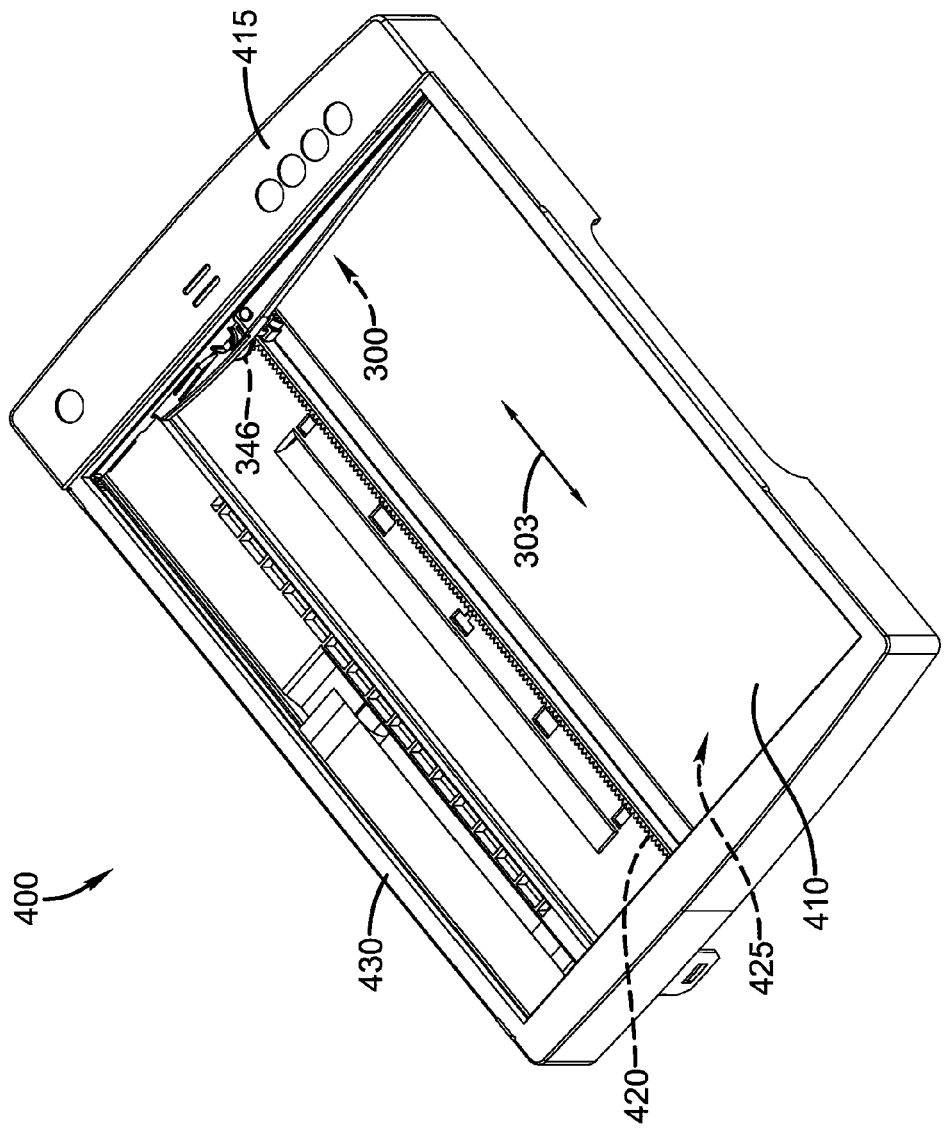
FIG. 9 is a perspective view of a portion of a scanner unit including a scan bar assembly.

FIG. 8 shows a top view and FIG. 9 shows a top perspective view of portions of scanner unit 400 with the lid removed so that more components are visible. Spacer rollers 309 of scan bar assembly 300 are in contact with the bottom of scanner glass 410. Scanner glass 410 (also generically called a transparent platen herein) is held by holder 430 (see FIG. 9) of frame 425. Rack 420 extends across the floor of frame 425 of scanner unit 400. In FIG. 9 a portion of follower gear 346 is seen near rack 420. Control panel 415 (seen in FIG. 9 but removed in FIG. 8) is used to control functions (such as copying or scanning) of the imaging system 400. In this example, scanner unit 400 includes a curved side 417 that is able to curve inward toward its ends and still have scan bar assembly 300 fit next to curved side 417 due to the tapering of outer wall 317 of scan bar assembly 300. This inward curve allows a smaller footprint of scanner unit 400, and also provides an aesthetically pleasing look as an additional benefit.

Figure 10:
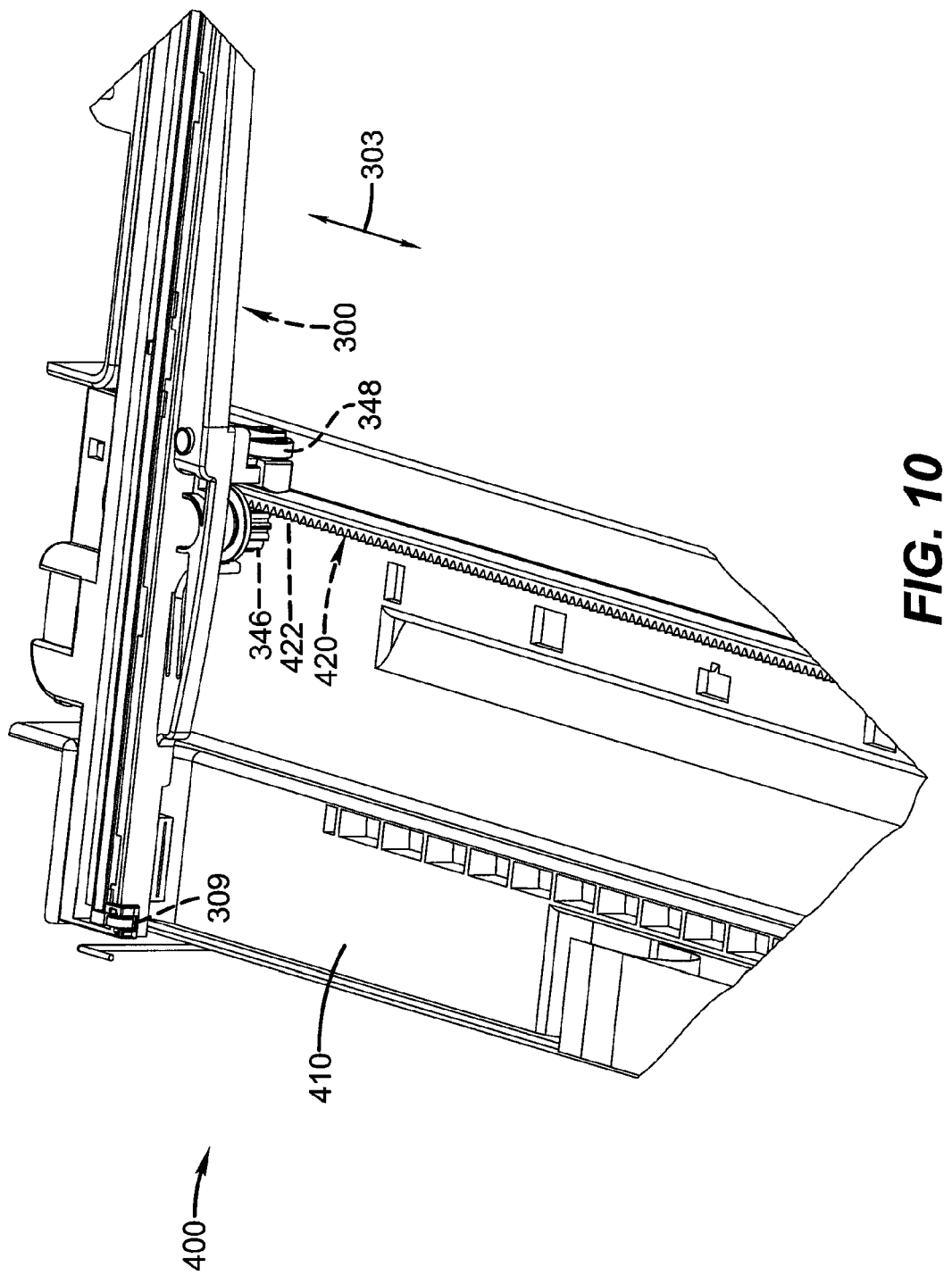
FIG. 10 is a close-up perspective view of a portion of a scanner unit including a scan bar assembly.

FIG. 10 shows a close up top perspective view of a portion of scanner unit 400. More clearly visible at this magnification and viewing angle is the engagement of follower gear 346 with rack teeth 422 of rack 420 that enables scan bar assembly 300 to move along scan direction 303. The second gear of the drive gear (not shown) is also engaged with the rack teeth, but it is not visible in the view of FIG. 10. Idle roller 348 is also shown riding on the floor of the frame 425 below scanner glass 410. A spacer roller 309 is shown riding on the bottom of the scanner glass 410.

Figure 11:
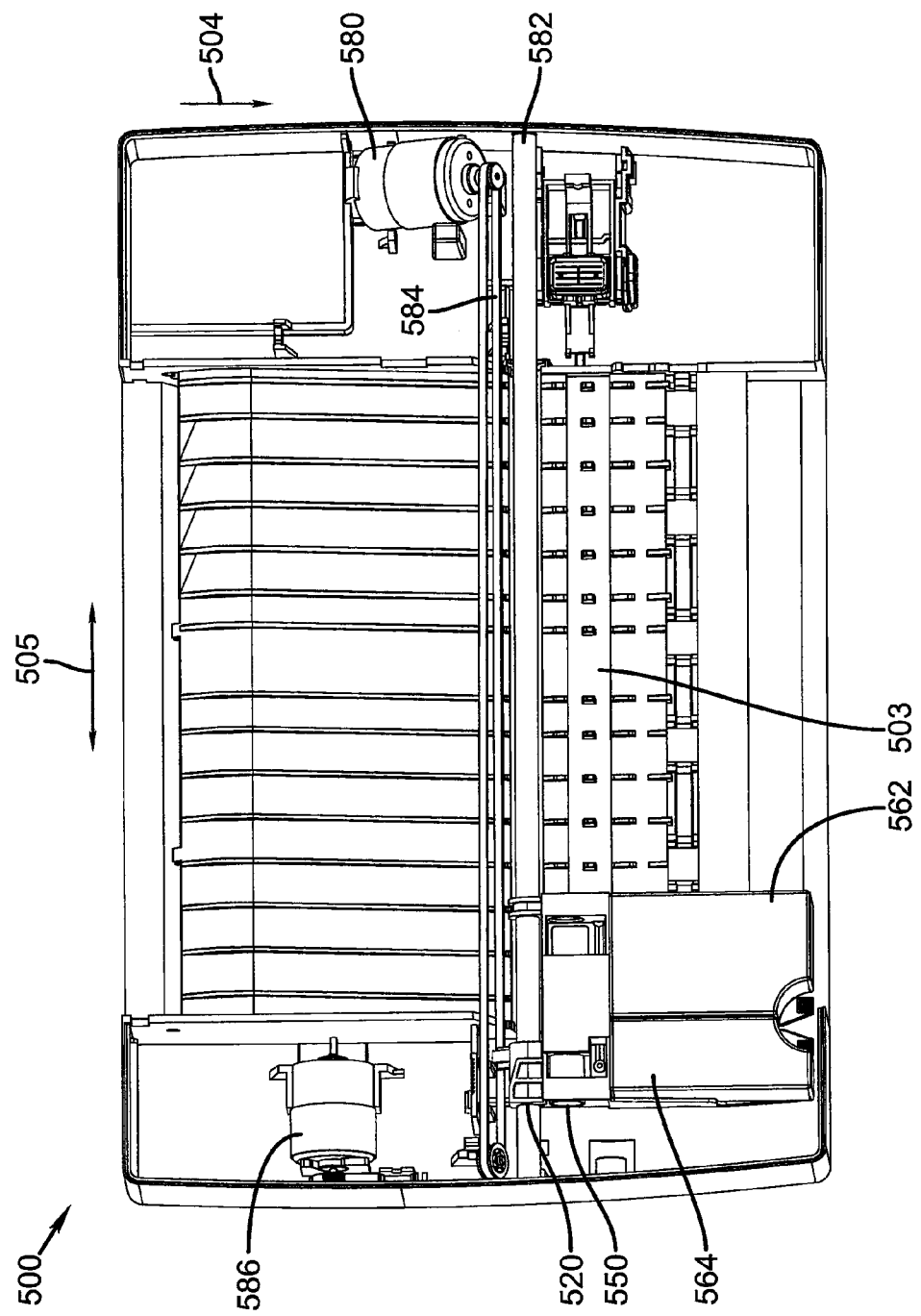
FIG. 11 is a top view of a printing mechanism that can be integrated together with the scanner unit of FIGS. 8-10 to provide a multi-function printer.

Scanner unit 400 can be a stand-alone scanner of an imaging system. Alternatively an imaging system can also include a printing mechanism as part of a multifunction printer. FIG. 11 shows a top view of an inkjet printing mechanism 500 that can be part of an imaging system together with scanner unit 400. Some of the parts of the printing mechanism 500 have been hidden in the view shown in FIG. 11 so that other parts can be more clearly seen. Paper (not shown) is advanced by paper advance motor 586 along paper advance direction 504. Printing mechanism 500 has a print region 503 across which carriage 520 is moved back and forth in carriage guide direction 505, while drops are ejected to print an image using printhead 550 that is mounted on carriage 520.

Multichamber ink tank 562 and single chamber ink tank 564 are mounted in a holding receptacle of printhead 550. Carriage motor 580 moves belt 584 to move carriage 520 along carriage guide 582. For an imaging system including both a scanner unit 400 and a printing mechanism 500, functions including copying, scanning and printing can all be performed. Optionally such an imaging system is connected to a host computer (not shown).

FIGS. 12 to 17 show an embodiment of the present invention that allows further width reduction of scan bar assembly 300, relative to the configuration of FIGS. 3 to 7, along a direction parallel to scan direction 303. When it was stated above, that as seen in FIGS. 4 and 7, no component of scan bar assembly 300 that is mounted on housing 310 extends beyond outermost side 336 of motor 330, the encoder wheel mounted on motor axle 332 was not included. In some configurations, encoder wheel 350 has a sufficiently large radius that it extends beyond the outermost side 336 of motor 330. Encoder wheel 350 needs to have a sufficient number of markings per angular unit of rotation at the position where the markings are read by encoder sensor 333, that small angles of rotation of the motor axle 332 can be detected for good positional control of scan bar assembly 300. Low cost encoder wheels 350 are typically made of emulsion on plastic, but the resolution limit of emulsion on plastic is such that the diameter of the encoder wheel 350 is typically on the order of 22 mm. It is possible to make glass encoder wheels having a smaller diameter with markings at a suitable resolution for motion control of the scan bar assembly, but the cost of a glass encoder wheel can be at least ten times higher than the cost of a plastic encoder wheel.

Figure 12:
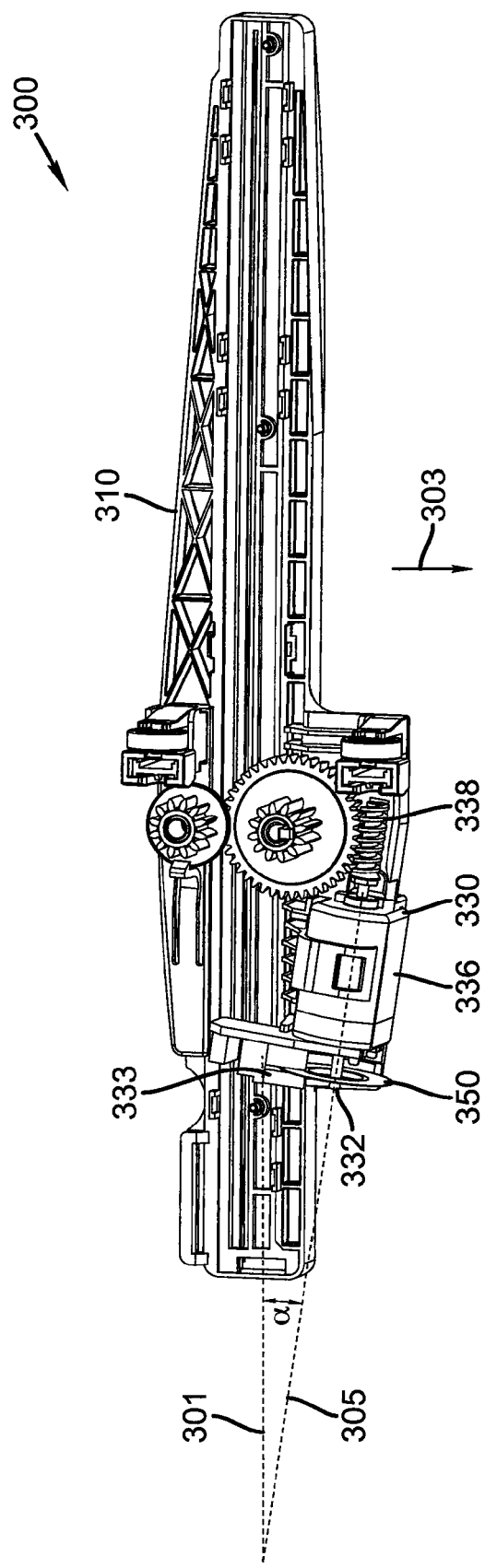
FIG. 12 is a bottom perspective view of a scan bar assembly having an obliquely mounted motor according to an embodiment of the invention.

For configurations where the encoder wheel 350 mounted on motor axle 332 extends past outermost side 336 of motor 330, the width of scan bar assembly 300 along a direction parallel to scan direction 303 can be made smaller by orienting motor 330 obliquely such that axle 332 is not parallel to the length direction 301. With reference to FIG. 12, scan element 302 (see FIG. 4) and photosensor array (not shown) extend along length direction 301, but axis 305 of axle 332 of motor 330 is obliquely oriented at an angle α with respect to length direction 301. In particular if the encoder wheel 350 is mounted on a first end of axle 332 and worm gear 338 is mounted on a second end of axle 332, the first end of axle 332 is positioned inwardly so that it is closer to scan element 302 than the second end of axle 332 is. Even though the encoder wheel 350 still extends beyond the outermost side 336 near the first end of axle 332, encoder wheel does not extend beyond outermost side 336 near the second end of axle 332 near worm gear 338. In a particular configuration, it was found that by orienting axis 305 of axle 332 of motor 330 at an angle α of approximately ten degrees, it was possible to reduce the overall width of scan bar assembly 300 by about 4 mm. In typical configurations it can be advantageous to orient axle 332 of motor 330 at an angle α of between five degrees and forty five degrees with respect to the length direction 301 of scan element 302, with the preferred angle depending on parameters including diameter of the encoder wheel 350, width of the motor 330 and length of the axle 332.

Figure 13:
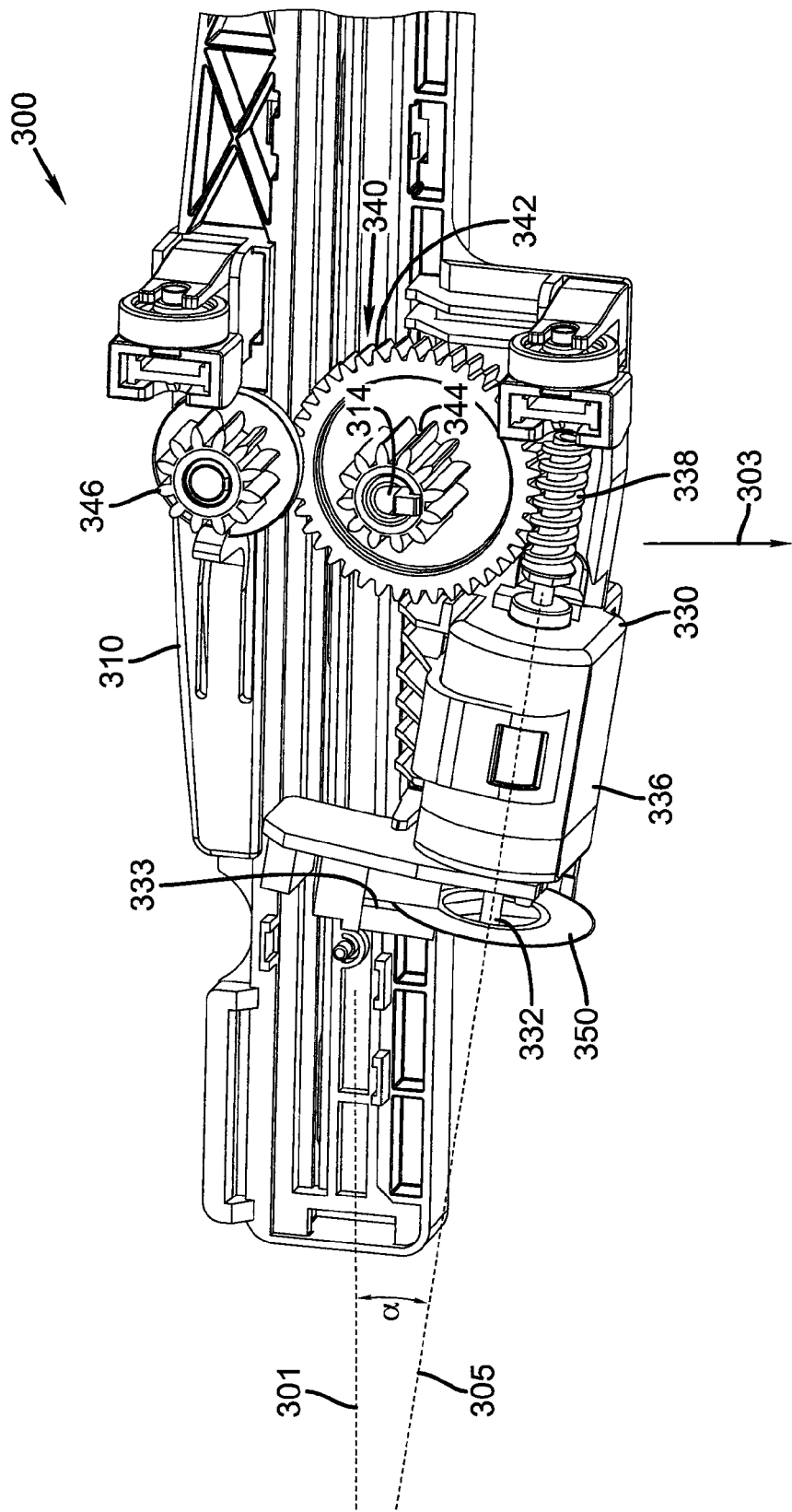
FIG. 13 is a close-up view of a portion of the scan bar assembly of FIG. 12.

A portion of the configuration shown in FIG. 12 is shown at higher magnification in FIG. 13 for clarity. FIG. 13 also shows that first gear 342 of drive gear 340 (mounted on first mounting member 314) is engaged with worm gear 338, as in the configuration of FIG. 4. Follower gear 346 and second gear 344 of drive gear 340 are also shown.

Figure 14:
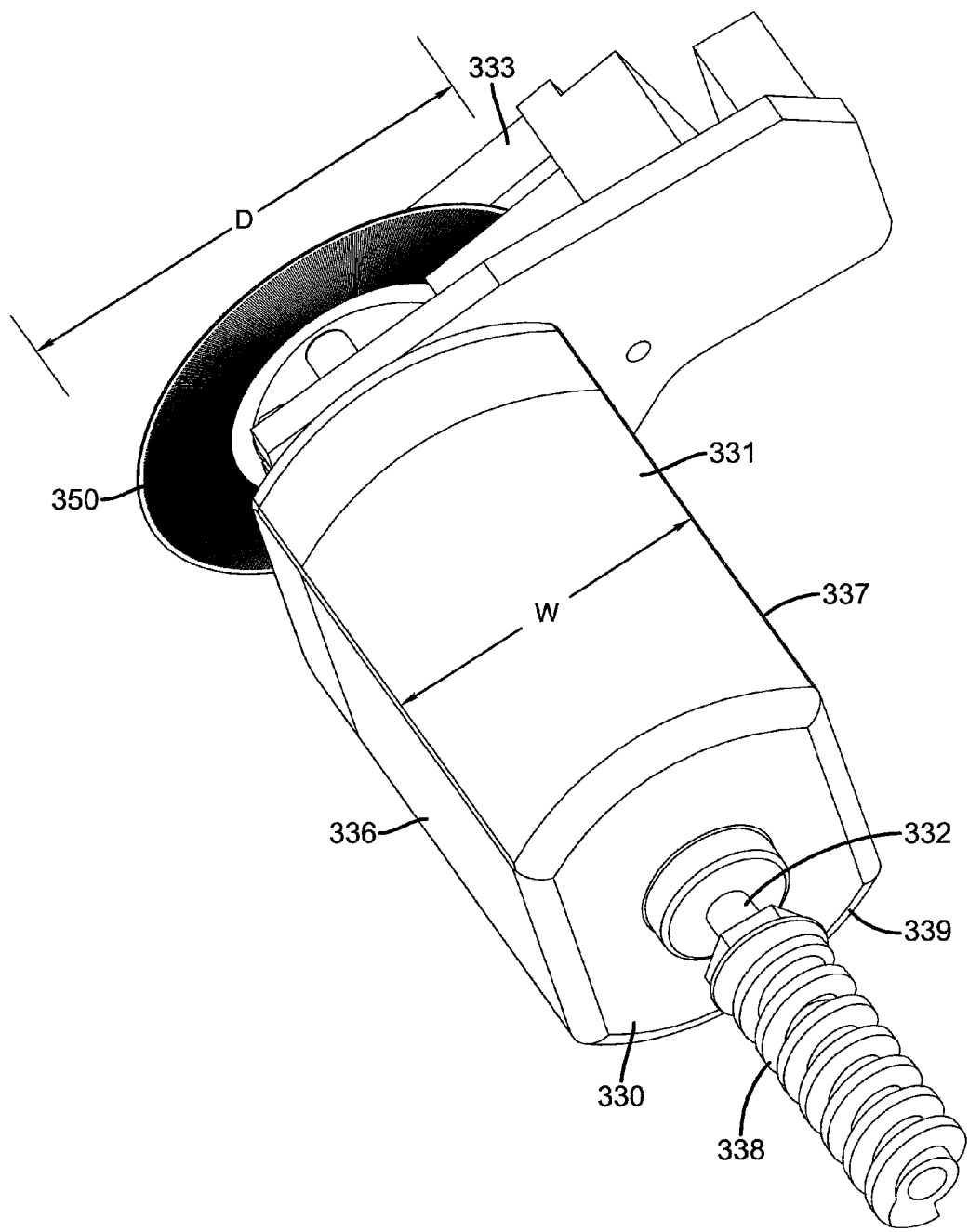
FIG. 14 is a close-up view of the motor, rotated somewhat relative to FIG. 12.
Figure 15:
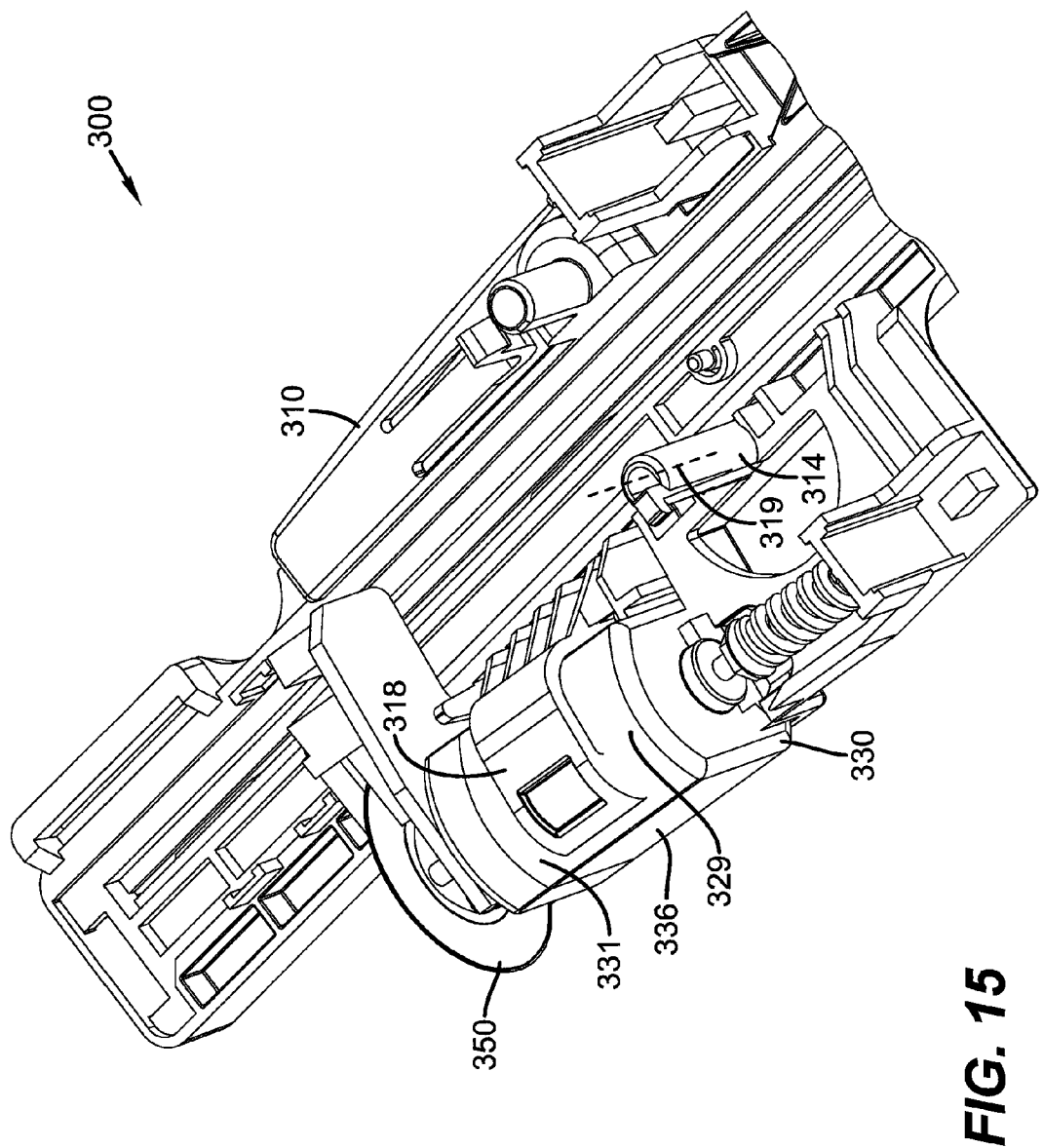
FIG. 15 is a close-up view of the motor mounted obliquely in the housing, rotated somewhat relative to FIG. 12.

FIG. 14 shows motor 330, axle 332, worm gear 338, encoder wheel 350, and encoder sensor 333, but without housing 310. Motor 330 has an outer casing having a first flat side (outermost side 336); a second flat side (innermost side 337) that is opposite first flat side 336 and at a distance W from it; a first round side 331 between the first flat side 336 and the second flat side 337; and a second round side 339 opposite the first round side 331. Diameter D of encoder wheel 350 is greater than distance W between first flat side 336 and second flat side 337. By having the outermost side 336 and the innermost side 337 be the flat sides (as is also true in the configuration of FIG. 4) the width of scan bar assembly 300 along a direction parallel to the scan direction can be reduced relative to the prior art configuration of FIG. 1, where the outermost and innermost sides of motor 220 are round sides. Another way to describe the configuration relative to FIG. 15 (including housing 310) is that axis 319 of first mounting member 314 is substantially parallel to first flat side 336, and is oriented substantially perpendicular to a central portion 329 of first round side 331. Clip 318 fastens over first round side 331 to hold motor 330 to housing 310 by snap fitting.

Figure 16:
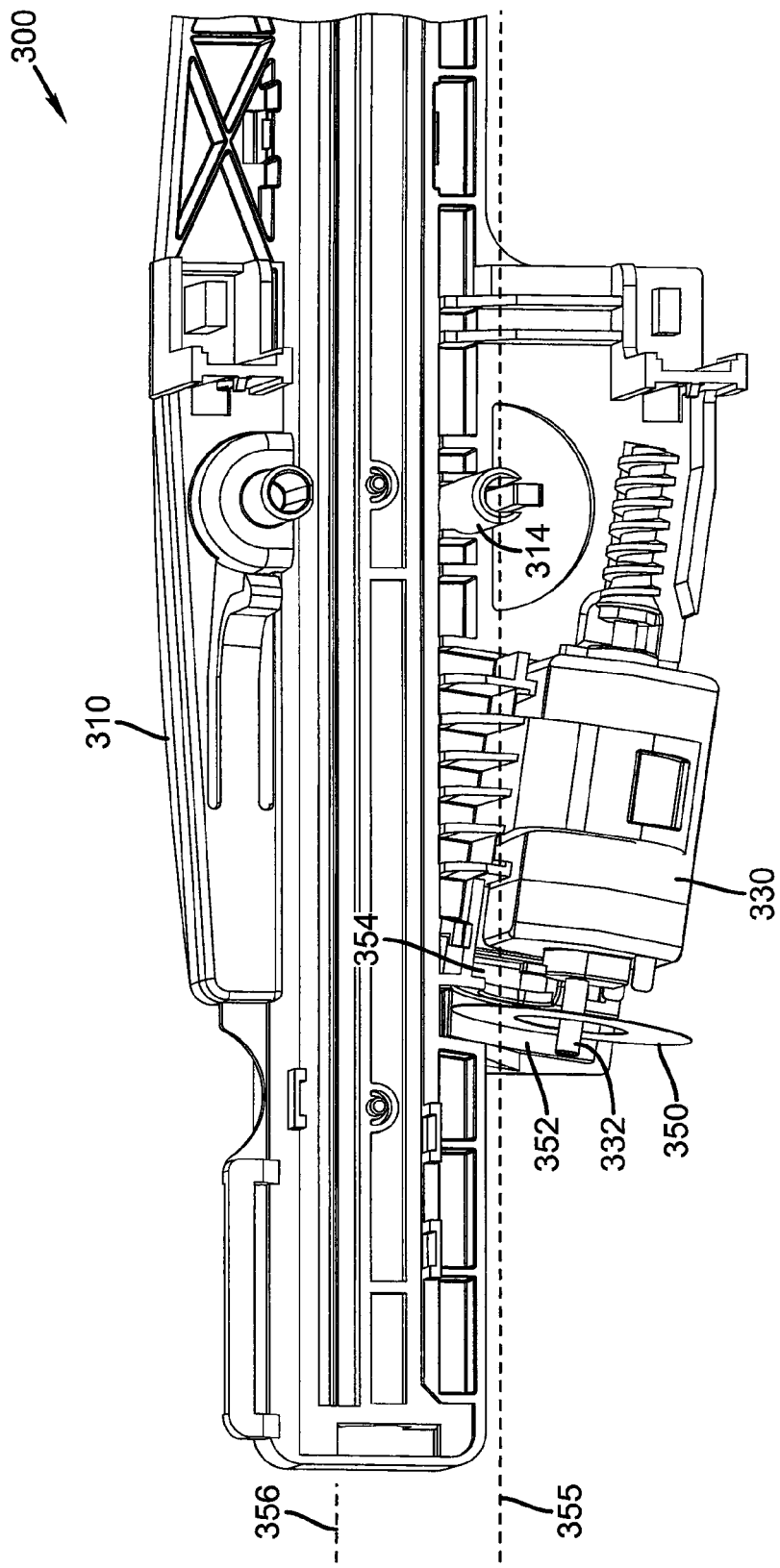
FIG. 16 is a close-up bottom view of a portion of the scan bar assembly of FIG. 12.
Figure 17:
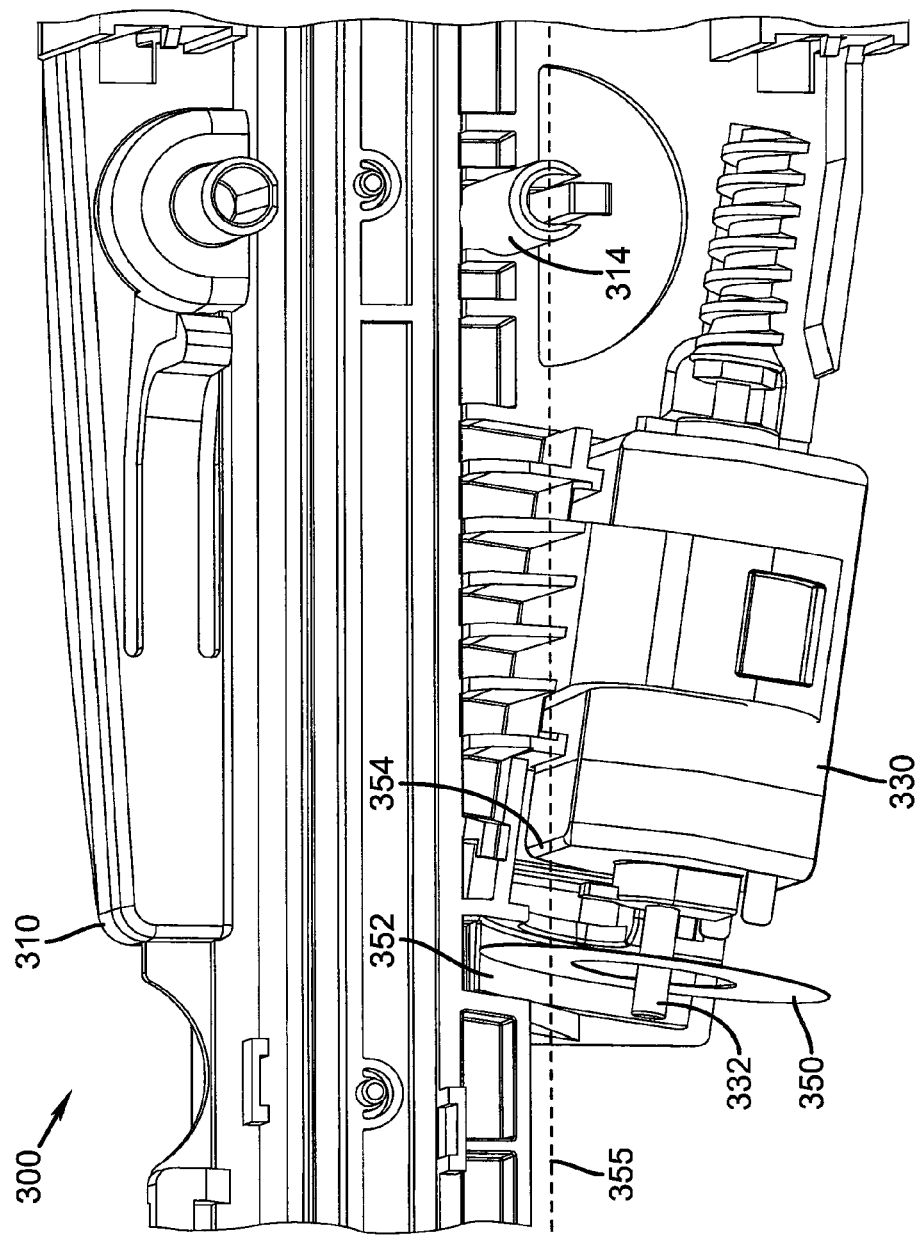
FIG. 17 is a closer view of a portion of the scan bar assembly seen in FIG. 16.

As in the configuration shown in FIGS. 3 to 7, housing 310 holds scan element 302, motor 330 and drive gear 340. In the configuration of FIGS. 12 to 17, as shown in FIGS. 16 and 17 (close-up view of a portion of FIG. 16), housing 310 includes a cutout 352 to accommodate the inward portion of encoder wheel 350.

Also shown in FIGS. 16 and 17, the end of motor 330 from which the portion of axle 332 extends on which encoder wheel 350 is mounted includes an edge 354 that is at a distance from scan element location (indicated by 356) that is substantially the same as or less than the distance from the first mounting member 314 for drive gear 340 (see FIG. 12) to the scan element, as indicated by reference line 355. This is made possible by the oblique mounting of the motor 330, such that the inward portion of encoder wheel 350 is accommodated by cutout 352.

The scan bar assembly 300 configuration of FIGS. 12 to 17 can be used advantageously in an imaging system including a scanner unit 400 described above with reference to FIGS. 8 to 10. Advantages provided by the configuration of FIGS. 12 to 17 include having a more compact configuration, and having the center of mass of the scan motor moved closer to the centerline of the scan element and the drive bearing datums, in order to achieve lower cost, improved motion stability, and faster scanning capability. Such a scanner unit 400 can be a stand-alone scanner of an imaging system. Alternatively an imaging system can also include a printing mechanism 500 as part of a multifunction printer as described above relative to FIG. 11.

In summary, the present invention includes a scan bar assembly having a scan element including a length direction; and a motor including an axle, wherein the axle of the motor is not parallel to the length direction of the scan element. The present invention also includes an imaging system includes a scanner glass; a frame including: a holder for the scanner glass; and a rack having a row of rack teeth; and a scan bar assembly comprising: a scan element including a length direction; a gear that is engaged with the rack teeth of the rack; and a motor including an axle, wherein the axle of the motor is not parallel to the length direction of the scan element.

PARTS LIST

120 Scanner
122 Platen
124 Carriage
125 Bolt
126 Wheel
127 Gear retainer tab
128 Bias
130 Drive
132 Light source
134 Reflected light capture unit
135 Scanner module
144 Top surface 152 Surface
158 Scan direction
200 Central portion
202 Side portion
204 Body
206 Well
210 Cap
214 Wheel
216 Stationary surface
220 Motor
221 Motor printed circuit board
224 Worm gear
225 Gear
226 Pinion gear
228 Pinion gear
230 Rack
300 Scan bar assembly
301 Length direction
302 Scan element
303 Scan direction
304 Printed circuit board (for scan element 302)
305 Axis
306 Light source
308 Lens
309 Spacer rollers
310 Housing
311 First wall
312 Mounting region
313 Second wall
314 First mounting member
315 Gear retaining member
316 Second mounting member
317 Outer wall
318 Clip
319 Axis (of first mounting member)
320 Gear retention member
322 Cantilevered arm
324 End
326 Roller mount extension
328 Support (for motor PC board 334)
329 Central portion (of first round side)
330 Motor
331 First round side
332 Axle
333 Encoder sensor
334 Slot
335 Printed circuit board (for motor 330)
336 Outermost side
337 Innermost side
338 Worm gear
339 Second round side
340 Drive gear
342 First gear
344 Second gear
346 Follower gear
348 Idle roller(s)
350 Encoder wheel
352 Cutout
354 Edge (of end of motor)
355 Reference line
356 Scan element location
400 Scanner unit
410 Scanner glass
415 Control panel
417 Curved side
420 Rack
422 Rack teeth
425 Frame
430 Holder
500 Printing mechanism
503 Print region
504 Paper advance direction
505 Carriage guide direction
520 Carriage
550 Printhead
562 Multichamber ink tank
564 Single chamber ink tank
580 Carriage motor
582 Carriage guide
584 Belt
586 Paper advance motor

The invention claimed is:

1. A scan bar assembly comprising:
a scan element having a length direction;
a motor having an axle, wherein the axle of the motor is obliquely oriented relative to the length direction of the scan element, and the motor includes an outer casing having a first flat side and a second flat side opposite the first flat side; and
an encoder wheel mounted on the motor axle, the encoder wheel including a diameter D that is greater than W, a distance from the second flat side to the first flat side.

2. The scan bar assembly of claim 1, wherein the axle of the motor is oriented at an angle of between five degrees and forty five degrees with respect to the length direction of the scan element.

3. The scan bar assembly of claim 1 further comprising:
a worm gear mounted on the motor axle;
a drive gear engaged with the worm gear; and
a housing comprising:
a mounting region for mounting the scan element; and
a mounting member for the drive gear.

4. The scan bar assembly of claim 3, the housing further comprising a clip for snap fitting the motor to the housing.

5. The scan bar assembly of claim 1 further comprising a drive gear mounted on a mounting member having an axis, the outer casing further includes:
a first round side between the first flat side and the second flat side; and
a second round side opposite the first round side, wherein the axis of the mounting member of the drive gear is oriented substantially perpendicular to a central portion of the first round side, and wherein the axis of the mounting member is substantially parallel to the first flat side.

6. The scan bar assembly of claim 1, wherein the encoder wheel is made of plastic.

7. The scan bar assembly of claim 1 further comprising a housing for holding the scan element, the motor, and a drive gear, wherein the housing includes a cutout to accommodate the encoder wheel.

8. The scan bar assembly of claim 1, wherein the encoder wheel is mounted on a first end of the motor axle and a worm gear mounted on a second end of the motor axle, wherein the first end of the motor axle is closer to the scan element than the second end of the motor axle is.

9. The scan bar assembly of claim 8, the motor further including a first end from which the first end of the axle extends, the scan bar assembly further comprising a housing including a mounting member for a drive gear that is engaged with the worm gear, wherein an edge of the first end of the motor is at a distance from the scan element that is substantially the same as or less than the distance from the mounting member for the drive gear to the scan element.

10. An imaging system comprising:
a scanner glass;
a frame including:
a holder for the scanner glass; and
a rack having a row of rack teeth; and
a scan bar assembly comprising:
a scan element having a length direction;
a gear that is engaged with the rack teeth of the rack; and
a motor having an axle, wherein the axle of the motor is obliquely oriented relative to the length direction of the scan element, and the motor includes an outer casing having a first flat side and a second flat side opposite the first flat side; and
an encoder wheel mounted on the motor axle, the encoder wheel including a diameter D that is greater than W, a distance from the second flat side to the first flat side.

11. The imaging system of claim 10, wherein the axle of the motor is oriented at an angle of between five degrees and forty five degrees with respect to the length direction of the scan element.

12. The imaging system of claim 10, the gear engaging the rack teeth being a follower gear, the scan bar assembly further comprising:
a worm gear mounted on the motor axle;
a drive gear engaged with the worm gear and the follower gear; and
a housing comprising:
a mounting region for mounting the scan element; and
a mounting member for the drive gear, the mounting member including an axis.

13. The imaging system of claim 12, the housing further comprising a clip for snap fitting the motor to the housing.

14. The imaging system of claim 12, the outer casing further includes:
a first round side between the first flat side and the second flat side; and
a second round side opposite the first round side, wherein the axis of the mounting member of the drive gear is substantially perpendicular to a central portion of the first round side, and wherein the axis of the mounting member is substantially parallel to the first flat side.

15. The imaging system of claim 10, wherein the encoder wheel is made of plastic.

16. The imaging system of claim 10, the scan bar assembly further comprising a housing for holding the scan element, the motor, and a drive gear, wherein the housing includes a cutout to accommodate the encoder wheel.

17. The imaging system of claim 10, wherein the encoder wheel is mounted on a first end of the motor axle and a worm gear mounted on a second end of the motor axle, wherein the first end of the motor axle is closer to the scan element than the second end of the motor axle is.

18. The imaging system of claim 17, the motor further including a first end from which the first end of the axle extends, the scan bar assembly further comprising a housing including a mounting member for a drive gear that is engaged with the worm gear, wherein an edge of the first end of the motor is at a distance from the scan element that is substantially the same as or less than the distance from the mounting member for the drive gear to the scan element.

19. The imaging system of claim 10 further comprising a printing mechanism.

* * * * *